(12) United States Patent
Ghannam et al.

(10) Patent No.: US 10,035,392 B2
(45) Date of Patent: Jul. 31, 2018

(54) SELF-CLOSING ELECTRIC SOCKET COVER

(71) Applicant: Ford Global Technologies, LLC, Dearborn, MI (US)

(72) Inventors: Mahmoud Yousef Ghannam, Canton, MI (US); Swadad A. Carremm, Canton, MI (US); Joel Allen Pittenger, Rochester Hills, MI (US); David James Tippy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/367,342

(22) Filed: Dec. 2, 2016

(65) Prior Publication Data

US 2018/0154716 A1 Jun. 7, 2018

(51) Int. Cl.
*B60D 1/64* (2006.01)
(52) U.S. Cl.
CPC ...................... *B60D 1/64* (2013.01)
(58) Field of Classification Search
CPC ................. B60R 1/003; B60K 2015/0538
See application file for complete search history.

(56) References Cited

U.S. PATENT DOCUMENTS

| | | | | |
|---|---|---|---|---|
| 5,066,062 A * | 11/1991 | Sekulovski | ............ | B60K 15/05 292/144 |
| 6,971,663 B1 | 12/2005 | Blake | | |
| 9,527,394 B1 * | 12/2016 | Tang | ................... | B60L 11/1818 |
| 2007/0257549 A1 * | 11/2007 | Tandy, Jr. | ............. | B60T 8/1708 303/7 |
| 2013/0076059 A1 * | 3/2013 | Zalan | ...................... | E05B 83/34 296/97.22 |
| 2015/0042278 A1 * | 2/2015 | Leary | .................. | B60L 11/1824 320/109 |
| 2015/0306928 A1 * | 10/2015 | McCollum | ............ | B60T 13/662 340/431 |
| 2016/0176373 A1 | 6/2016 | Weigand et al. | | |
| 2016/0311341 A1 * | 10/2016 | Nada | ................... | B60L 11/1885 |
| 2017/0001517 A1 * | 1/2017 | Herrmann | .............. | B60K 15/05 |

FOREIGN PATENT DOCUMENTS

| | | |
|---|---|---|
| DE | 102007002798 A1 | 7/2008 |
| EP | 0677407 A1 | 10/1995 |
| EP | 2456015 A3 | 7/2012 |
| WO | 2015114154 A2 | 8/2015 |

OTHER PUBLICATIONS

Search Report issued by the United Kingdom Intellectual Property Office dated May 24, 2018 regarding Application No. GB1719745.0 (4 pages).

* cited by examiner

*Primary Examiner* — Aaron L Troost
(74) *Attorney, Agent, or Firm* — Frank A. MacKenzie; Bejin Bieneman PLC

(57) ABSTRACT

A computer is programmed to actuate an electric socket mounted to an exterior of a vehicle to close upon determining that the vehicle's speed exceeds a predetermined threshold, that a cover is open, and that the electric socket is in an electrically disengaged state.

19 Claims, 11 Drawing Sheets

SELF-CLOSING ELECTRIC SOCKET COVER

BACKGROUND

A vehicle can be equipped with a hitch for towing another vehicle such as a trailer, a motor home, etc. The towed vehicle is usually electrically coupled to the towing vehicle via an electric socket to operate electrical components of the towed vehicle. For example, an electric plug of the towed vehicle can be connected to the electric socket of the towing vehicle. The electric socket may have a cover to prevent a wear and tear of the electric socket when not in use, e.g., when a plug is not connected. Wear and tear of electric contacts in the socket, corrosion, dirt, etc., can arise when the cover is left open while the electric socket is unused.

DETAILED DESCRIPTION

Introduction

A vehicle 100 computer 110 is programmed to actuate an electric socket 115 mounted to an exterior of a vehicle 100 to close a cover 120. For example, the computer 110 could be programmed to instruct closing of the cover upon determining that a speed of the vehicle 100 exceeds a predetermined threshold, e.g., 10 km/h, that the cover 120 is open, and that the electric socket 115 is in an electrically disengaged state.

Exemplary System Elements

Figure 1:
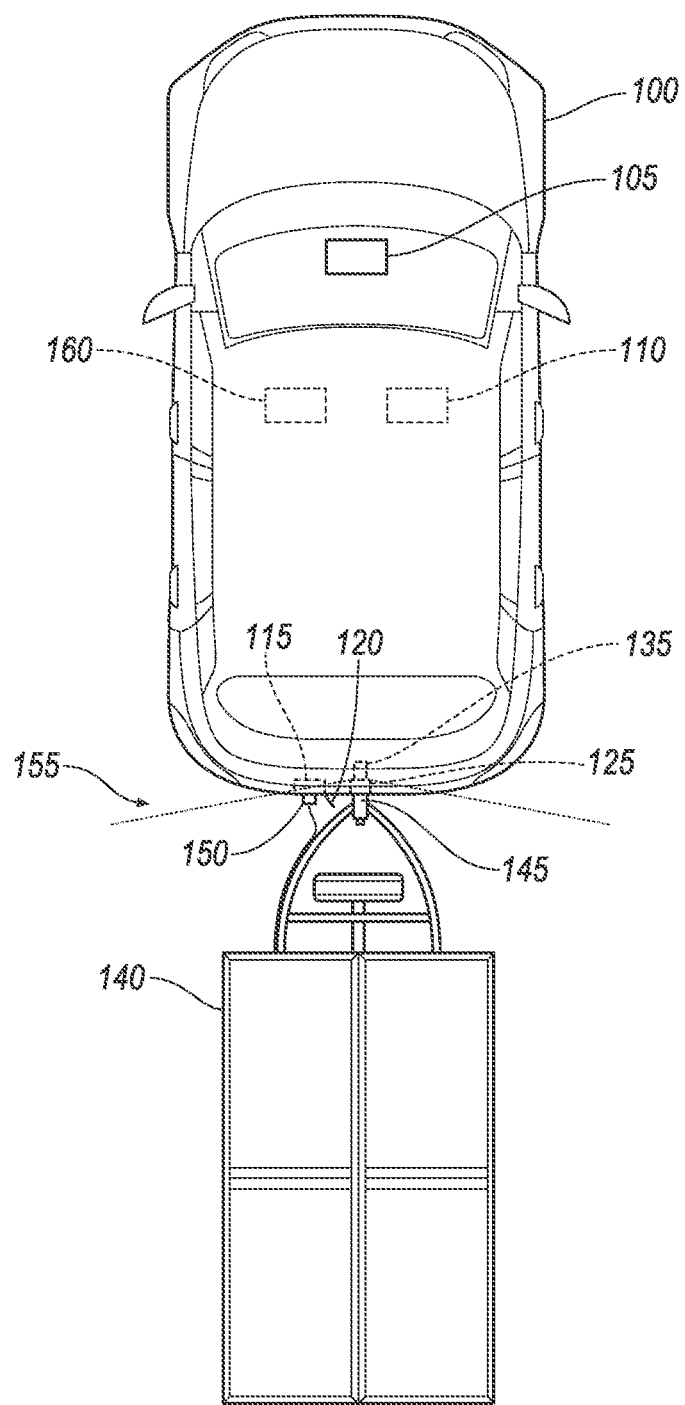
FIG. 1 is a top view of an example vehicle and trailer.

FIG. 1 illustrates a vehicle 100 with a trailer 140. The vehicle 100 may include a user interface 105, a computer 110, an electric socket 115 with a cover 120, a camera sensor 135, and a hitch 125. Although illustrated as a sedan, the vehicle 100 may include any passenger or commercial automobile configured to tow a second vehicle such as a trailer 140, e.g., the vehicle 100 can be a car, a truck, a van, a bus, etc.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle 100 for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., sensor, actuators, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless communication interface to communicate with other computers, e.g., a remote server computer. The wireless communication network represents one or more mechanisms by which the computer 110 of vehicle 100 may communicate with other computers, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized).

To tow the trailer 140, the vehicle 100 may include the hitch 125 for mechanically coupling the trailer 140 to the vehicle 100. Additionally or alternatively, the vehicle 100 may include other types of mechanical attachments such a coupler, lock, etc., to couple the vehicle 100 to another vehicle, e.g., the trailer 140.

The vehicle 100 may include an electric socket 115 mounted to an exterior of the vehicle 100, e.g., underneath a vehicle 100 bumper. For example, the electric socket 115 may provide electric power and/or other electrical connections to the trailer 140, e.g., to lights included on the trailer 140. The electric socket 115 may include a cover 120 that can prevent wear and tear of the socket 115, e.g., contamination by water, dirt, etc. when the socket 115 is unused. That the socket 115 is "unused" in the present context means that the electric socket 115 is not in an electrically engaged state with a plug 150 or the like of a trailer 140. To electrically engage the plug 150 to the socket 115, the plug 150 may be releaseably coupled to the socket 115.

The vehicle 100 may include one or more vision sensors such as a camera sensor 135. The camera sensor 135 is an electronic sensor for obtaining a digital image such as is known. The camera sensor 135 captures image data from a field of view 155 including an area exterior to the vehicle 100. The field of view 155 may include a rear area of the vehicle 100. In one example, the field of view 155 may provide a view of a trailer 140, if present. Additionally, the field of view 155 may provide a view of at least a part of the hitch 125 and/or at least a part of the electric socket 115, e.g., the cover 120. As one example, the camera sensor 135 may be mounted to the socket 115, to a vehicle 100 rear bumper, or to another location on a vehicle 100 exterior.

Using image processing techniques, the computer 110 may detect objects in the field of view 155. For example, the computer 110 may detect a trailer 140 based on image data received from the camera sensor 135. Thus, the computer 110 may determine, based on a received image, whether the detected trailer 140 is mechanically connected to the vehicle 100, e.g., whether the hitch 125 is in a mechanically coupled state. As another example, the computer 110 may be programmed to determine whether the electric socket 115 cover 120 is open or closed. In yet another example, the computer 110 may be programmed to determine whether a trailer 140 is mechanically coupled to the vehicle 100, e.g., via a trailer 140 hook 145. In one example, the computer 110 may be programmed to detect a trailer 140 plug 150 and determine whether the plug 150 is attached to the electric socket 115, e.g., whether the socket 115 is in the electrically engaged state.

As another example, the vehicle 100 may include other types of sensors to determine whether a trailer 140 is mechanically connected to the vehicle 100. For example, the vehicle 100 may include a switch mounted to the vehicle 100 hitch 125. Thus, the switch may be actuated when a trailer 140 hook 145 is coupled to the vehicle hitch 125. The computer 110 can then determine whether the trailer 140 is mechanically coupled to the vehicle 100 based on a status of the switch.

The user interface 105 may be configured to present information to a user, such as a driver, during operation of the vehicle 100. Moreover, the user interface 105 may be configured to receive user inputs. Thus, the user interface 105 may be located in the passenger compartment of the vehicle 100. In some possible approaches, the user interface 105 may include a touch-sensitive display screen. For example, the user interface 105 may output a message to the user indicating that the electric socket 115 cover 120 is left open while the socket 115 is unused.

Actuators of the vehicle 100 are implemented via circuits, chips, or other electronic and/or electromechanical components that can actuate various vehicle subsystems in accordance with appropriate control signals as is known. The actuators may be used to control braking, acceleration, and/or steering of the vehicle 100. In one example, the computer 110 may actuate the electric socket 115 to close, e.g., the cover 120. As another example, the computer 110 may actuate a vehicle 100 transmission to prevent a vehicle 100 movement, e.g., by preventing a transfer of torque from a vehicle 100 powertrain to vehicle 100 wheels.

The trailer 140 may include a vehicle (usually a non-powered vehicle) such as a utility trailer, a recreational vehicle, a motor home, a cargo trailer, etc. that can be mechanically coupled to the vehicle 100. To mechanically couple the trailer 140 to the vehicle 100, in one example, the trailer 140 may include a hook 145. The hook 145 can be mechanically coupled to the vehicle 100 hitch 125, e.g., via a locking pin, etc. Additionally or alternatively, the trailer 140 may be mechanically coupled to the vehicle 100 via a latch lever, a screw, a padlock, etc.

To electrically couple the trailer 140 to the vehicle 100, the trailer 140 may include a wiring harness with the plug 150 in addition to a hook 145 or the like. The plug 150 can be mechanically coupled to the electric socket 115, e.g., via a clip, etc. While the plug 150 and the electric socket 115 are mechanically coupled, an electrical connection can be established between the trailer 140 and the vehicle 100. For example, via the electrical connection, trailer 140 lights can be powered by a vehicle 100 electric power supply.

Figure 2:
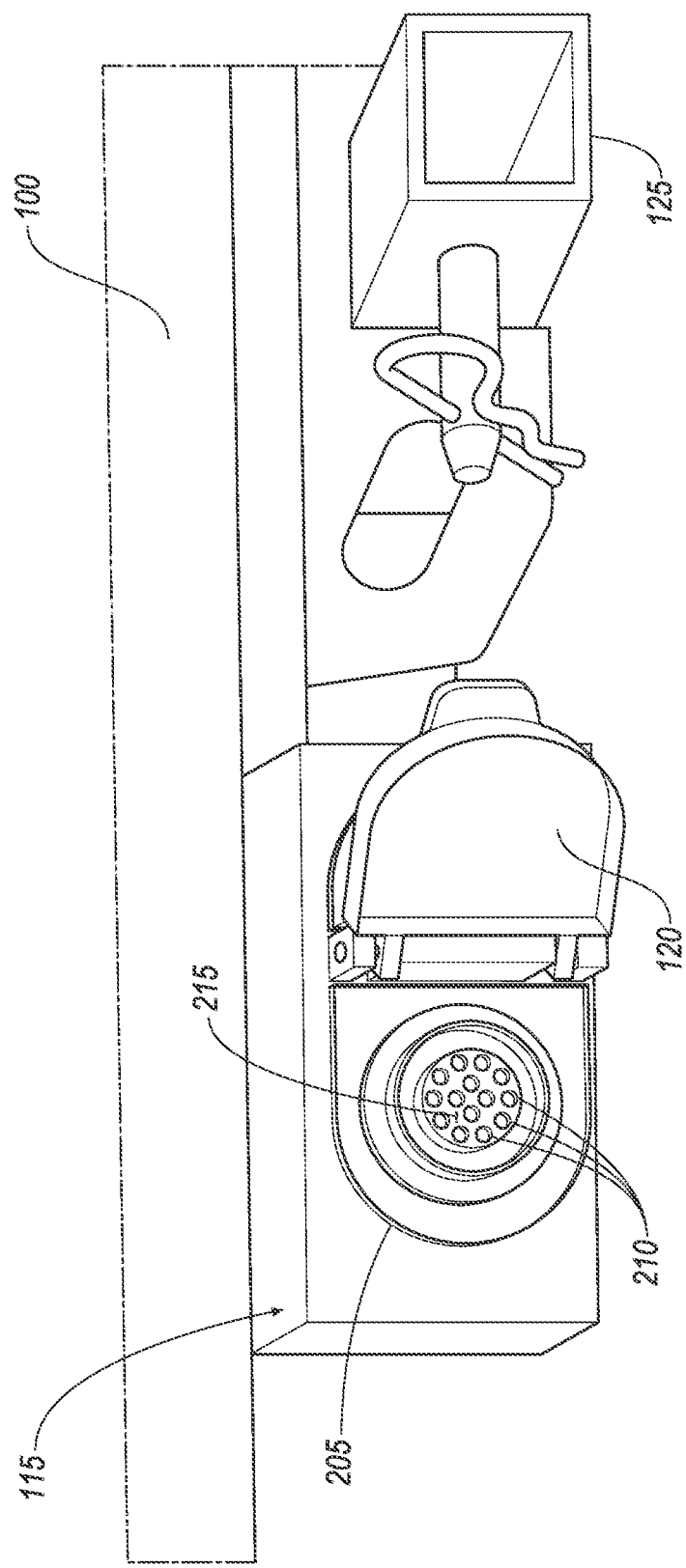
FIG. 2 is a rear view of the vehicle of FIG. 1 with an example open electric socket.

FIG. 2 is a rear view of the vehicle 100 with an open electric socket 115. The electric socket 115 includes a body 205 mountable to an exterior of the vehicle 100. The electric socket 115 includes one or more electric contacts 210 within the body 205 and a cover 120 pivotably mounted to the body 205. The electric contacts 210 may be electrically insulated from one another, e.g., via insulating materials disposed between the electric contacts 210. The electric socket 115 is "open" when the cover 120 is in an open state, e.g., pivoted away from, and generally exposing, the electric contacts 210. Thus, a plug 150 can be connected to the socket 115 when the cover 120 is open. As one example, the cover 120 may be referred to as "open" when an angle between the cover 120 and a socket 115 surface 215 is greater than 90 degrees.

Each of the electric contacts 210 may include a first end connectable to an electric contact of the trailer 140 plug 150, and a second end (not shown) that can be wired to sensors, actuators, computer 110, and/or a battery of the vehicle 100. Thus, the socket 115 electric contacts 210 provide an electrical connection between vehicle 100 electric components and trailer 140 electric components.

Figure 3:
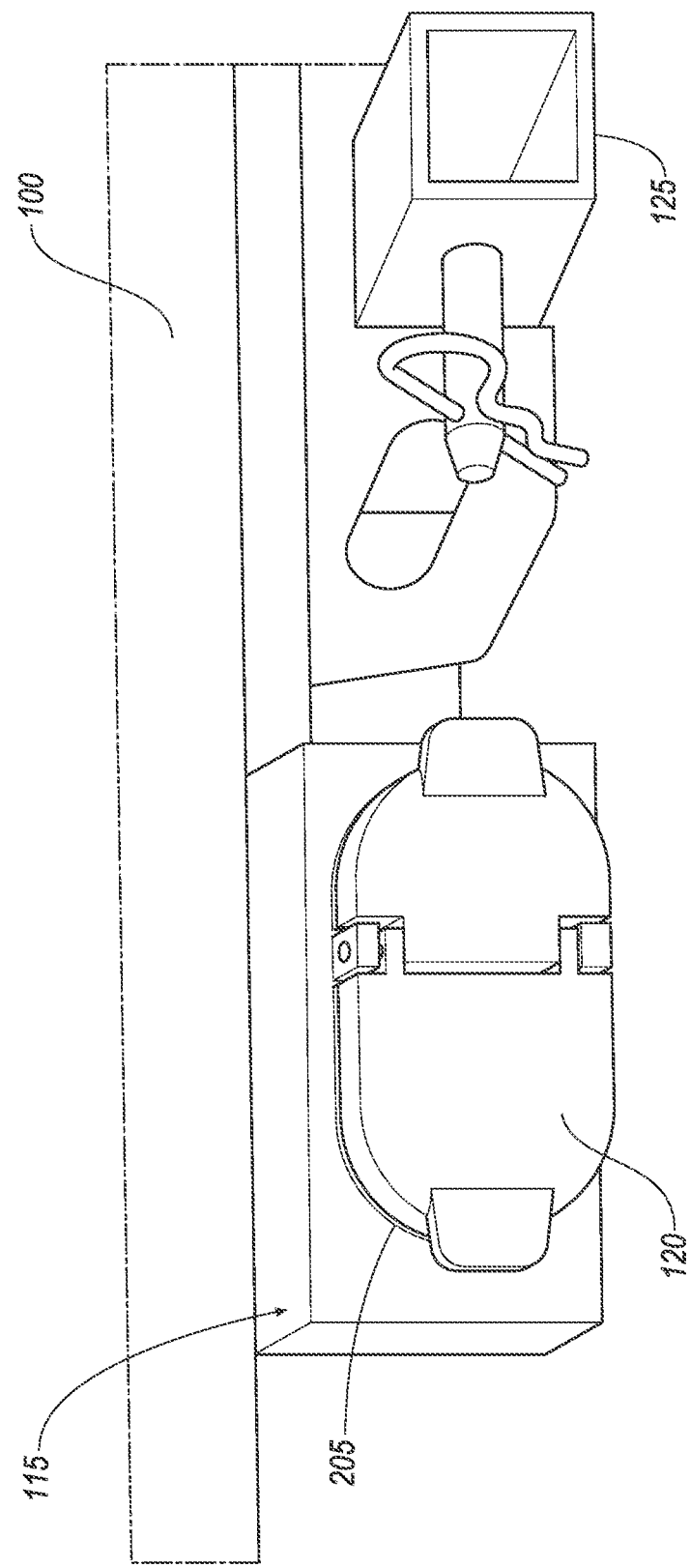
FIG. 3 is a rear view of the vehicle of FIG. 1 with an example closed electric socket.

FIG. 3 is a rear view of the vehicle 100 with a closed electric socket 115. The electric socket 115 is "closed" when the cover 120 is in a closed state, e.g., typically covering the electric contacts 210 of the socket 115. The cover 120 in the closed state may prevent exposure of the electric contacts 210 to other elements, e.g., water, dirt, etc. As discussed below, the socket 115 can be opened or closed via an electric actuator.

Figure 4:
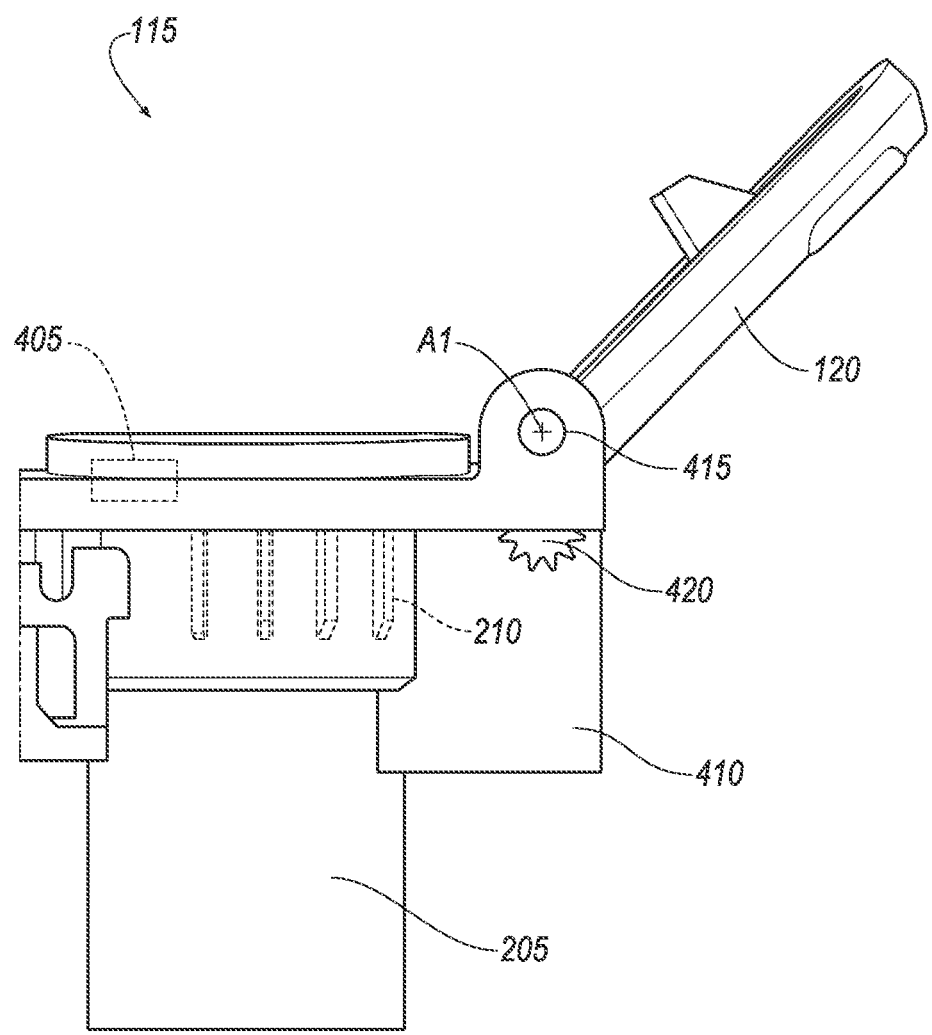
FIG. 4 is a perspective view of an electric socket of FIGS. 2-3.

FIG. 4 is a perspective view of the electric socket 115 including an electric motor 410 to open and/or close the cover 120. The electric motor 410 may be attached to an outside surface of the body 205. As another example, the body 205 may enclose the electric motor 410. The electric motor 410 may be mechanically coupled to the cover 120 via a motor 410 gear 420. In one example, the cover 120 may be pivotably mounted to the body 205 via a pin 415. Thus, the cover 120 may pivot about a longitudinal axis A1 of the pin 415 to open and/or close the cover 120. Additionally or alternatively, the electric socket 115 may include other types of electric actuators to open and/or close the cover 120, e.g., a solenoid actuator. Additionally, the electric socket 115 may include a cover status sensor 405 that indicates a state of the cover 120, e.g., open or closed. For example, the cover status sensor 405 may include a proximity sensor mounted to the socket 115 body 205. Additionally or alternatively, the state of the cover 120 may be determined by detecting whether the cover 12o gear 610 has reached an end 620, as discussed with reference to FIG. 9.

Figure 5:
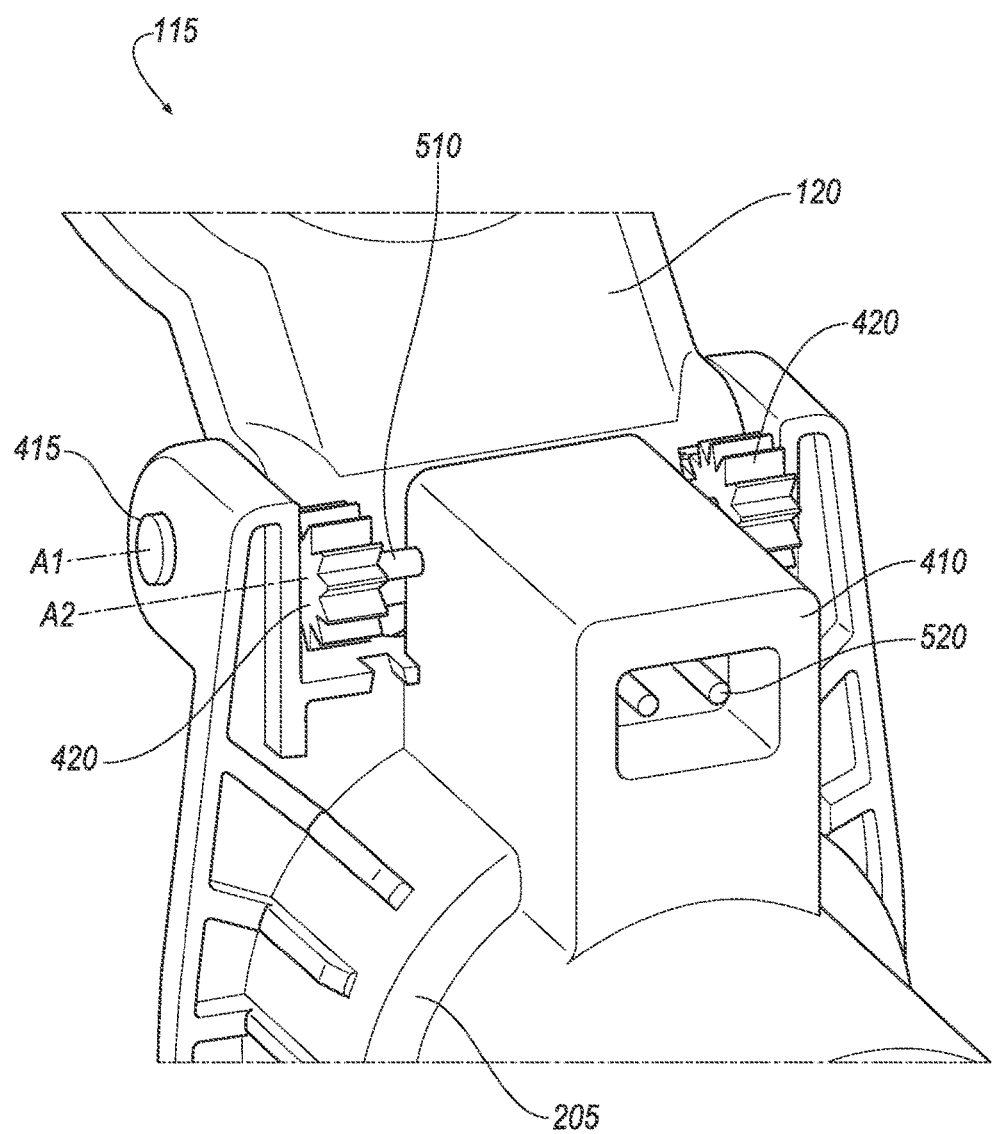
FIG. 5 is a detailed perspective view of a portion of the electric socket of FIG. 4.

In one example, shown in FIG. 5, the electric socket 115 includes a motor 410 shaft 510 and the motor 410 gear 420 to mechanically couple the cover 120 to the electric motor 410. Thus, a torque generated by the electric motor 410 can be transferred to the cover 120 via an engagement of motor gears 420 and cover 120 gears 610. Additionally, the motor 410 may include a second internal shaft that is transverse to a longitudinal axis A2 of the shaft 510 and mechanically coupled to the shaft 510, e.g., via a gearbox. The motor 410 shaft 510 rotates about the axis A2 to open and/or close the cover 120. In one example, the computer 110 may operate the motor 410 to rotate in two directions to open and/or close the cover 120. The electric motor 410 may include a connector 520 to electrically couple the electric motor 410 with a vehicle 100 wiring harness. For example, the computer 110 may actuate the electric motor 410 via the electrical connector 520. Additionally, the electrical connector 520 may include electrical contacts to connect the electric socket 115 electric contacts 210 to the vehicle 100 wiring harness. Thus, the connector 520 may provide electrical connection from the vehicle 100 to the electric motor 410 and the socket 115 electric contacts 210. Alternatively, the socket 115 electric contacts 210 may be connected to the vehicle 100 wiring via another connector.

Figure 6:
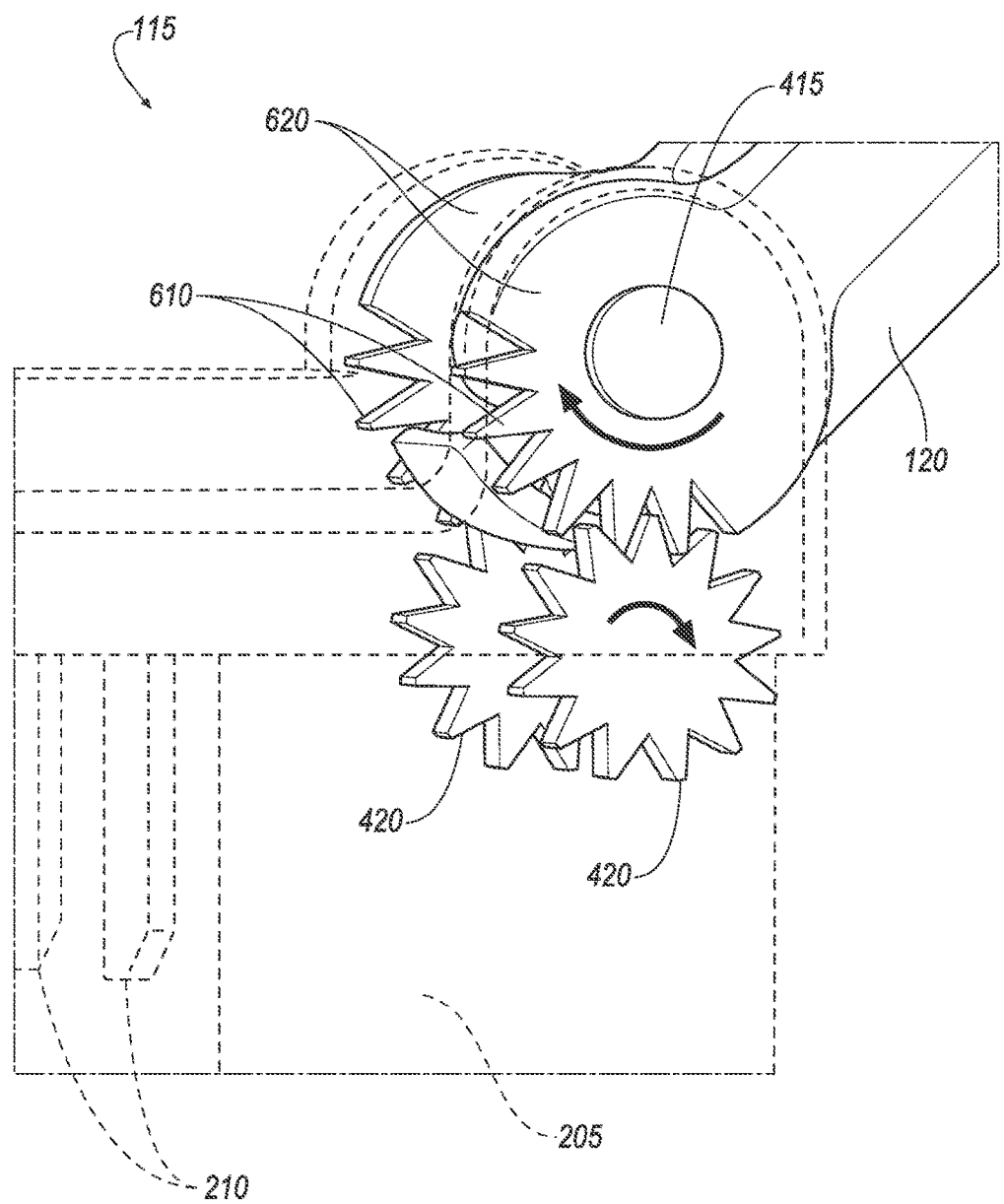
FIG. 6 is a detailed perspective view of another portion the electric socket of FIG. 4.

FIG. 6 illustrates an example cover 120 including ends 620 that each have a gear 610 engagable, e.g., meshed, with the motor 410 gear 420. For example, the cover 120 may include one or more circular or semi-circular ends 620. A circumference of each of the circular or semi-circular ends 620 may be centered about the axis A1. A portion of the circumference of each end 620 may include teeth of the gears 610 that are engagable with teeth of the gears 420. Each gear 610 may include multiple teeth mounted on at least a part of the circumference of the cover 120 ends 620. Due to mechanical coupling of the cover 120 gear 610 and the motor 410 gear 420, a rotation of the motor 410 gear 420 may open and/or close the cover 120. In one example, a number and/or size of the teeth included in the cover 120 gear 610 may define an angle that is associated with a rotational range of the cover 120 about the axis A1. For example, when a quarter of a circular circumference of the end(s) 620 is covered with teeth, then the cover 120 may have a rotational range of approximately 90 degrees about the axis A1, i.e., an angle between two end positions of the cover 120 may be 90 degrees. In one example, a number and/or a size of teeth of the gear 610 may be adjusted to provide an expected rotational range for the cover 120 about the axis A1.

Figure 7:
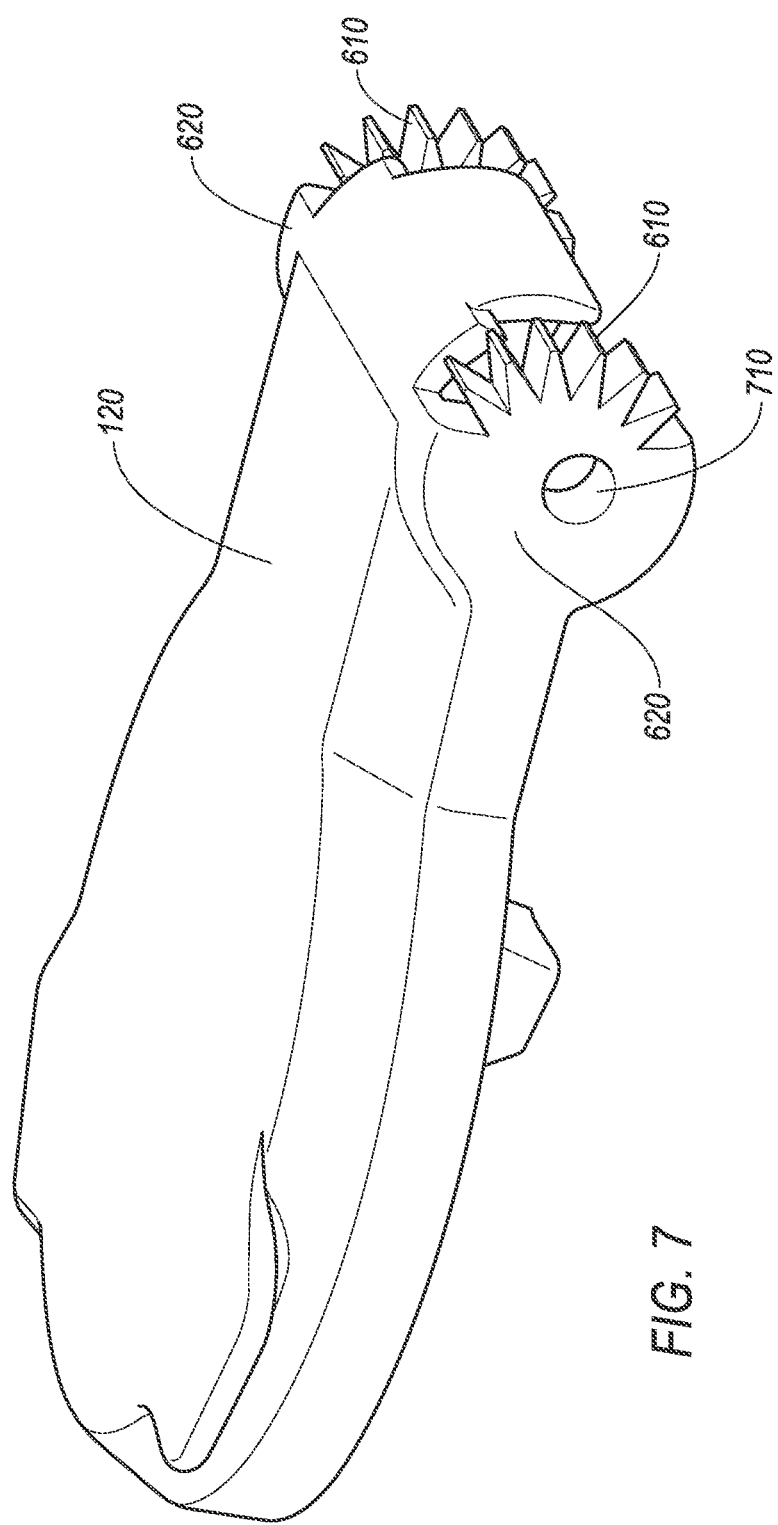
FIG. 7 is a perspective view of the cover of FIG. 4.

FIG. 7 illustrates an example cover 120 with the gear 610. The cover 120 can be pivotably mounted to the body 205 via the pin 415 passing through a hole 710 of the end 620. The hole(s) 710 of the end(s) 620 may be centered about the axis A1. Additionally or alternatively, the cover 120 may be pivotably mounted to the body 205 via other mechanisms such as a hinge, etc. As another example, the body 205 may include a protrusion in form of the pin(s) 415 to pivotably mount the cover 120 to the body 205. For example, the pins 415 may be permanently attached to the body 205 and rotationally coupled to the cover 120 through the holes 710.

Figure 8:
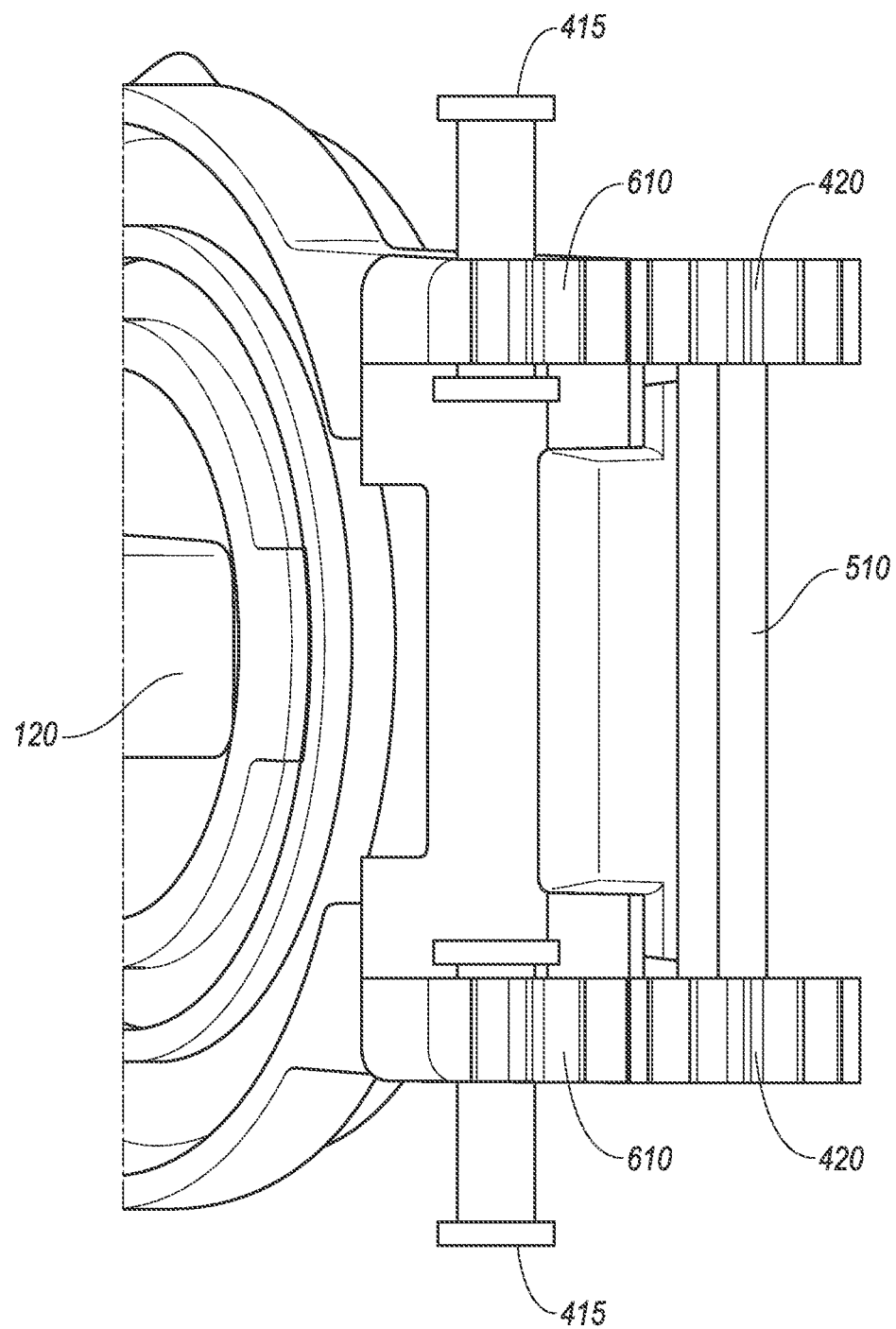
FIG. 8 is a perspective view of a portion of the cover of FIG. 4 engaged with gears of a motor shaft.

FIG. 8 illustrates the motor 410 shaft 510 coupled with the cover 120 via the motor 410 gear 420 and the cover 120 gear 610. The socket 115 may include two pins 415 to pivotably couple the cover 120 to the body 205. Alternatively, the socket 115 may include one pin 415 passing through multiple holes 710 of the cover 120 ends 615.

Figure 9:
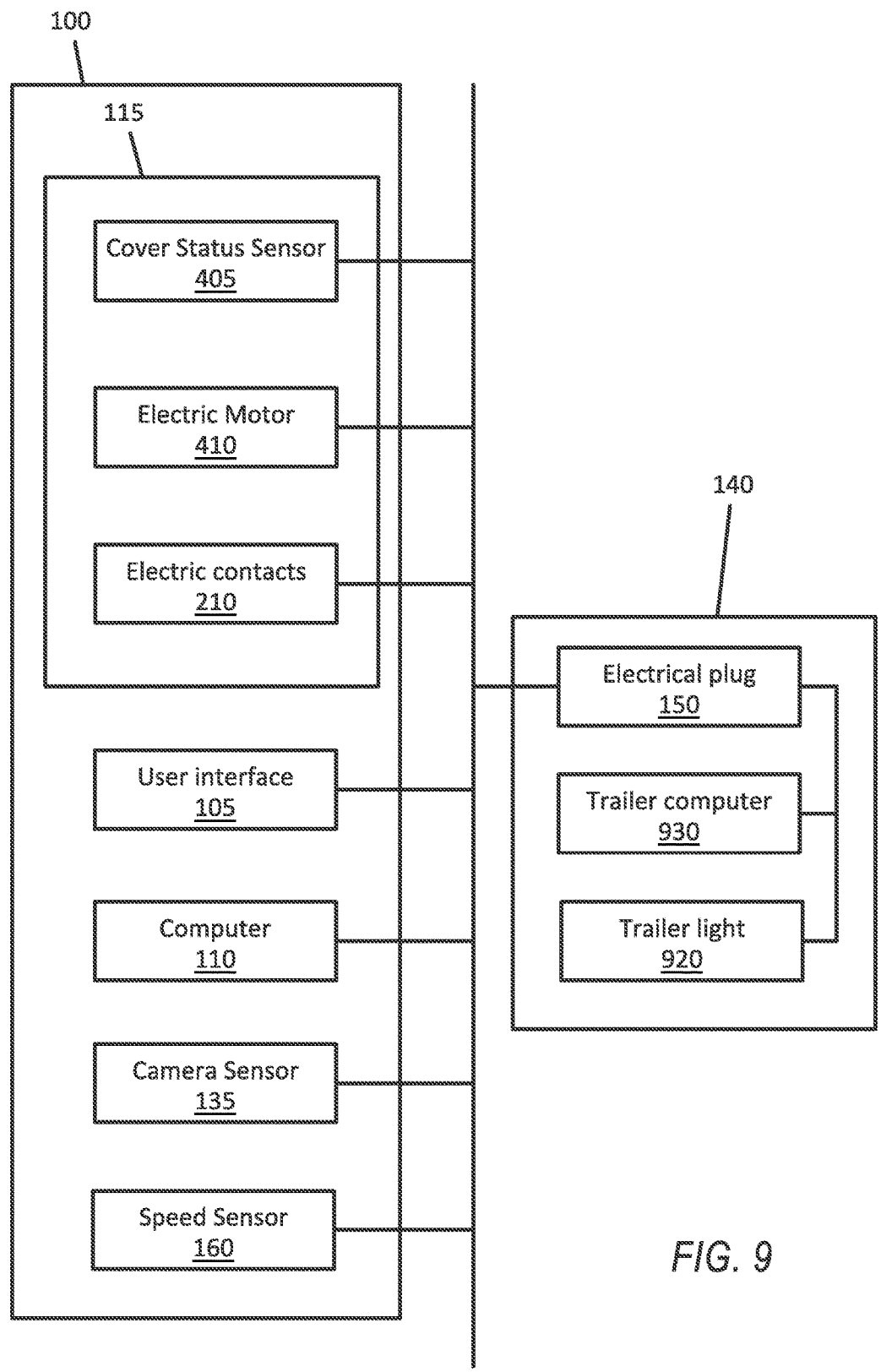
FIG. 9 is a block diagram showing electrically connected sub-components of a socket assembly installed in the vehicle of FIG. 1.

FIG. 9 is an example block diagram showing electrical sub-components of the trailer 140 and the vehicle 100 including the electric socket 115. The trailer 140 can be releaseably electrically connected to the vehicle 100 via the trailer 140 plug 150 and the vehicle 100 socket 115. The vehicle 100 computer 110 can be programmed to actuate the socket 115 electric motor 410 to open and/or close the cover 120 based at least in part on data received from the cover status sensor 405, the user interface 105, the camera sensor 135, and a vehicle 100 speed sensor 160. The trailer 140 may include various electrical components, e.g., a light 920, a computer 930, etc. In one example, electricity can be supplied to components of the trailer 140 via the plug 150 by a vehicle 100 electrical power supply. Additionally, a trailer 140 computer 930 may communicate via a vehicle 100 communication network to the vehicle 100 computer 110. For example, the trailer 140 computer 930 may actuate a trailer 140 brake actuator based on a brake actuating request received from the vehicle 100 computer 110. Additionally or alternatively, the computer 110 may be incorporated in the electric socket 115, e.g., an Application Specific Integrated Circuit (ASIC) computer 110 can be disposed within the socket 115 body 205.

The computer 110, in one example, may be programmed to determine whether the cover 120 is in the closed state based on data indicating a direction of movement of the electric motor 410 and data indicating whether a motor 410 load exceeds a load threshold, e.g., a current consumption threshold such as 5 Amp (amperes). When the gear 610 reaches a stopping point, i.e., runs out of teeth to engage with the gear 420, a further movement of the cover 120 may be prevented which leads to a higher electrical current consumption by the electric motor 410. Thus, the computer 110 may determine that the gear 610 has reached a stopping point associated with one of the closed and open states of the cover 120. Additionally, the computer 110 may determine whether the reached stopping point corresponds to the open or closed state based on the rotational direction of the motor 410 shaft 510.

With continued reference to FIG. 9, as one example, the vehicle 100 computer 110 may be programmed to determine that the socket 115 is in an electrically disengaged state by determining whether an electrical resistance between two electric contacts 210 of the electric socket 115 is greater than an electrical resistance threshold, e.g., 100 Ohm. In other words, an amount of electrical resistance greater than the electrical resistance threshold may indicate an open circuit that can be interpreted as an electrically disengaged socket 115. The electrical resistance threshold may be defined as a value greater than an expected electrical resistance between the two contacts 210 when the trailer 140 is connected, e.g., an electrical resistance of a trailer 140 light 920. For example, the computer 110 may be programmed to activate an electrical actuator such as a transistor, a relay, etc., to apply a voltage between the two electric contacts 210 of the socket 115, measure a current flowing through the two contacts 210, and determine the electrical resistance between the two contacts 210 based at least on the applied voltage and the measured current flow.

In another example, the vehicle 100 computer 110 can be programmed to determine that the socket 115 is electrically engaged with the trailer 140 based on a message received from the trailer 140 computer 930 via the vehicle 100 communication network. For example, upon receiving a CAN message following a request sent by the vehicle 100 computer 110, the vehicle 100 computer 110 may determine that the external computer 930 is connected to the vehicle 100.

Processing

Figure 10:
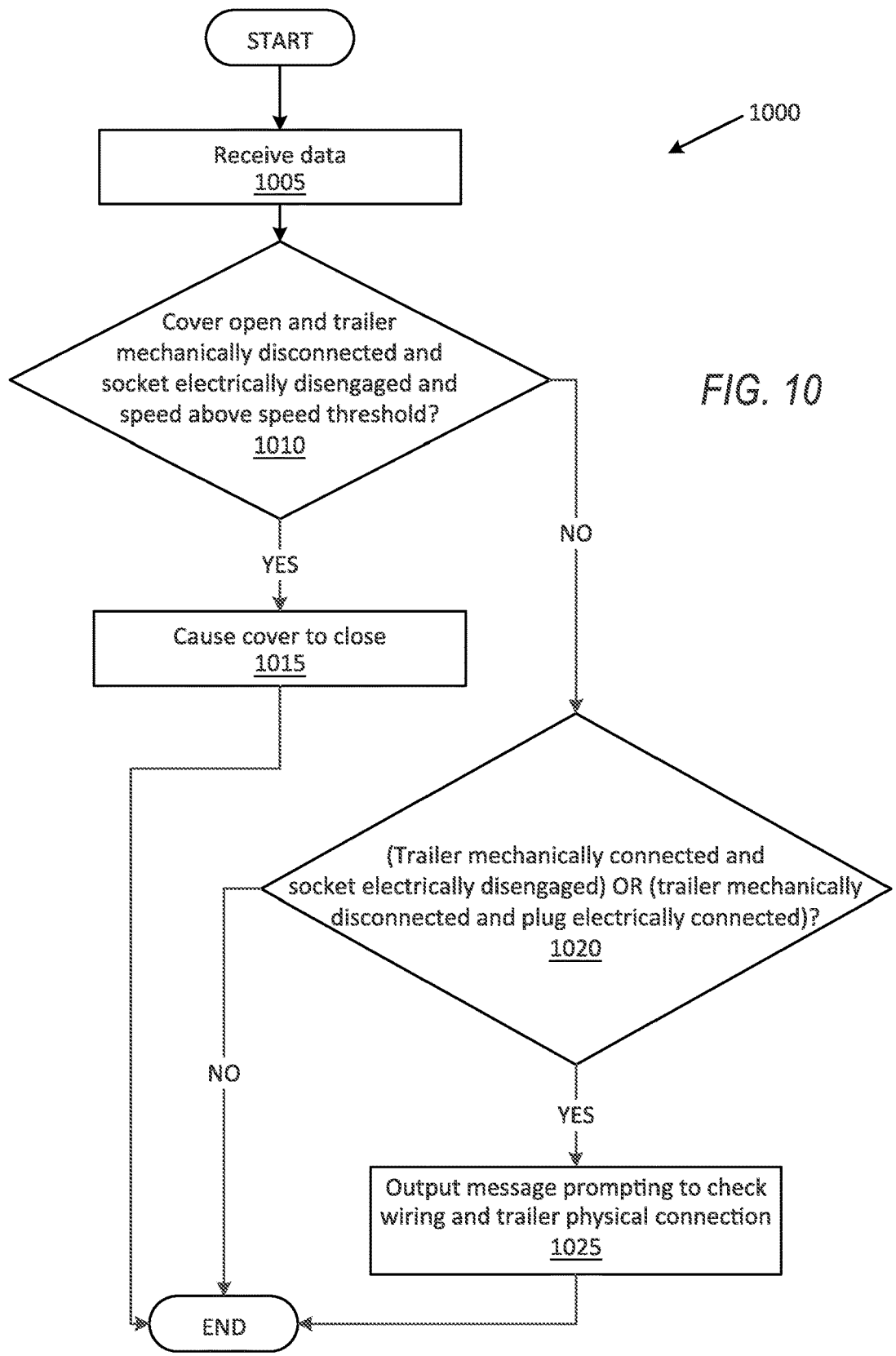
FIG. 10 is a flowchart of an exemplary process for controlling the cover of the electric socket.

FIG. 10 is a flowchart of an example process 1000 for controlling the socket 115 cover 120. In one example, the vehicle 100 computer 110 and/or a computer incorporated in the socket 115 can be programmed to execute blocks of the process 1000.

The process 1000 begins at a block 1005, in which the computer 110 receives data, from e.g., the cover status sensor 405, the speed sensor 160, the user interface 105, and the camera sensor 135.

Next, in a decision block 1010, the computer 110 determines, based on the received data, whether the cover 120 is open, the trailer 140 is mechanically disconnected, the socket 115 is in an electrically disengaged state, and the vehicle 100 speed above is above a predetermined speed threshold, e.g. 5 km/h. For example, the computer 110 may determine whether the trailer 140 is mechanically disconnected based on the received image data or data received from other type of sensors, e.g., a switch mounted to the vehicle 100 hitch 125. In one example, the computer 110 may be programmed to determine whether the socket 115 is in the electrically disengaged state based on image data received from the camera sensor 130. Additionally or alternatively, the computer 110 can make such determination based on a measured electrical resistance between contacts 210 of the socket 115 and/or received messages from a trailer 140 computer 930. The computer 110 may determine that the cover 120 is open based on image data received from the camera sensor 135, status data received from the cover status sensor 405, etc. If the computer 110 determines that the cover 120 is open, the trailer 140 is mechanically disconnected, the socket 115 is in an electrically disengaged state, and the vehicle 100 speed is above the predetermined speed threshold, then the process 1000 proceeds to a block 1015; otherwise the process 1000 proceeds to a decision block 1020.

In the block 1015, the computer 110 causes the socket 115 cover 120 to close. For example, the computer 110 may be programmed to actuate the socket 115 electric motor 410 to close the cover 120. Additionally, the computer 110 may be programmed to stop actuating the electric motor 410 upon determining, e.g., based on data received from the cover status sensor 405, that the cover 120 is closed. Following the block 1015, the process 1000 ends, or alternatively returns to the block 1005, although not shown in FIG. 10.

In the decision block 1020, the computer 110 determines whether one of two logical conditions are true; (1) a logical AND of "the trailer 140 is mechanically connected to the vehicle 100" and "the socket 115 is in an electrically disengaged state"; or (2) a logical AND of "the trailer 140 is mechanically disconnected to the vehicle 100" and "the socket 115 is in the electrically engaged state". In other words, the computer 110 determines whether a logical XOR of "the trailer 140 is mechanically connected to the vehicle 100" and "the socket 115 is in an electrically engaged state" is true. If the computer 110 determines that one and only one of these two logical conditions is true, then the process 1000 proceeds to a block 1025; otherwise the process 1000 ends, or alternatively returns to the block 1005, although not shown in FIG. 10.

In the block 1025, the computer 110 actuates an output device. For example, the computer 110 may be programmed to output a message via the user interface 105 to check a mechanical and/or electrical connection of the trailer 140 to the vehicle 100. In another example, the computer 110 may be programmed to actuate a transmission controller of the vehicle 100 to inhibit a drive mode of the vehicle 100, e.g., to prevent a movement of the vehicle 100. Additionally, the computer 110 may be programmed to actuate the transmission controller to override the inhibit in response to receiving an override request from, e.g., the use interface 105.

Following the block 1025, the process 1000 ends, or alternatively returns to the block 1005, although not shown in FIG. 10.

Figure 11:
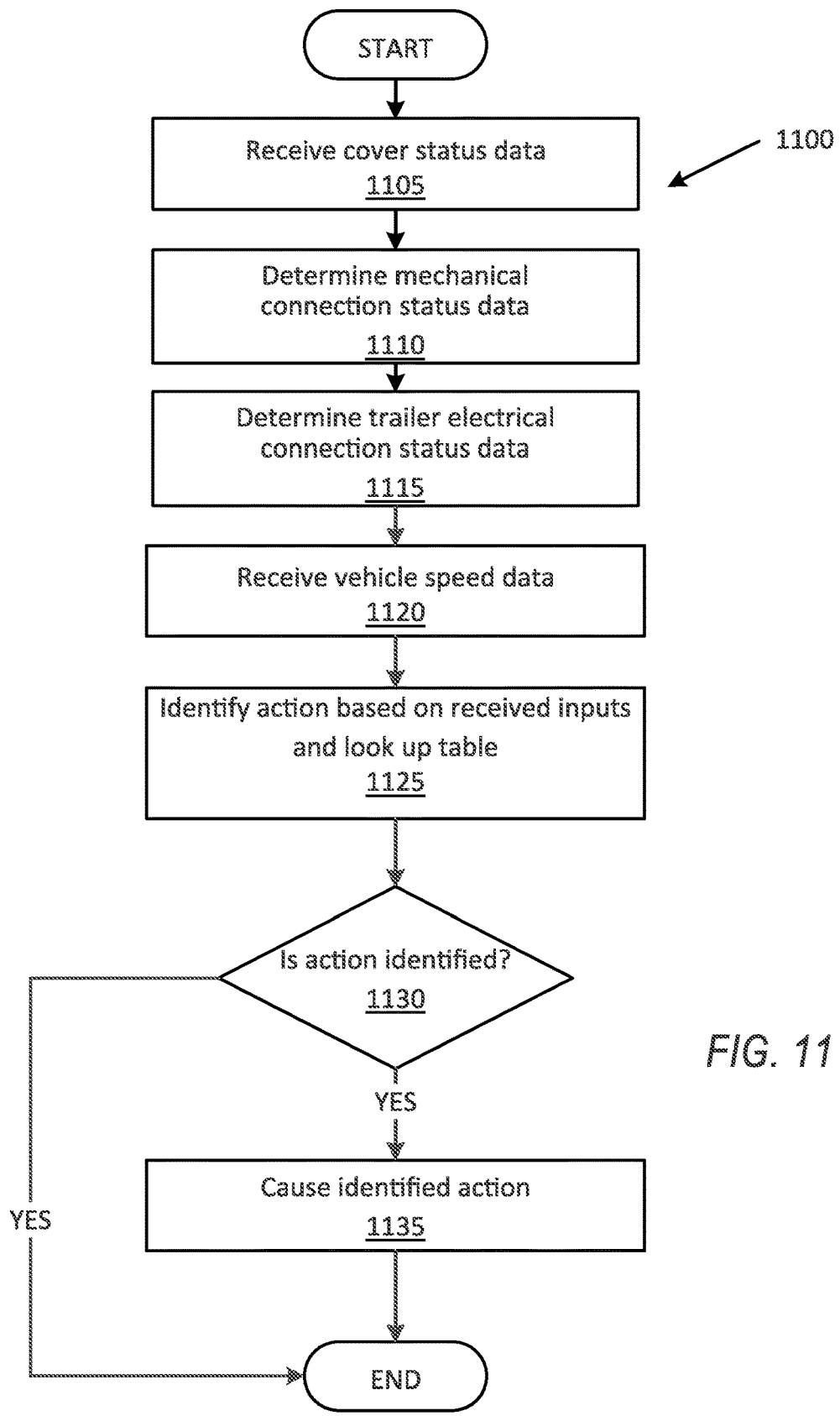
FIG. 11 is a flowchart of another exemplary process for controlling the cover of the electric socket.

FIG. 11 is a flowchart of another example process 1100 for controlling the cover 120 of the electric socket 115. For example, the computer 110 may be programmed to execute blocks of the process 1100.

The process 1100 begins in a block 1105, in which the computer 110 receives cover status data indicating whether the cover 120 is in the closed state. For example, the computer 110 may be programmed to receive the cover status data from the cover status sensor 405. Additionally or alternatively, the computer 110 may be programmed to determine whether the cover 120 is closed based on a current load of the electric motor 410, as described above. As another example, the computer 110 may determine the cover status data based on image data received from the camera sensor 135.

Next, in a block 1110, the computer 110 determines mechanical connection status data, e.g., indicating whether a trailer 140 hook 145 is mechanically connected to the vehicle 100 hitch 125. For example, the computer 110 may be programmed to determine the mechanical connection data based on an image received from the camera sensor 135.

Next, in a block 1115, the computer 110 determines socket electrical connection status data, e.g., indicating whether the socket 115 is in the electrically engaged state. For example, the computer 110 may be programmed to determine the electrical connection status data based on image data received from the camera sensor 135, e.g., by detecting the plug 150 attached to the socket 115. Additionally or alternatively, the computer 110 may determine the trailer electrical connection status data based on a message received from a trailer 140 electrical sub-components such as a computer 930 and/or determining an electrical resistance between two electrical contacts 210 of the socket 115, as described above.

Next, in a block 1120, the computer 110 receives speed data indicating a speed of the vehicle 100, e.g., from a vehicle 100 speed sensor 160.

Next, in a block 1125, the computer 110 identifies one or more actions based on comparing the received inputs to stored reference data, e.g., a lookup table as shown in Table 1 below. The received inputs include the cover status data indicating whether the cover 120 is open or closed, the trailer mechanical connection status data indicating whether a trailer 140 is mechanically connected to the vehicle 100, the socket electrical connection status data indicating whether the socket 115 is electrically engaged, and the speed data. The identified action(s) may include actuating the electric motor 410 to close the cover 120, and/or actuating a device, e.g., outputting a message to a vehicle 100 user interface 105. The computer 110 may be programmed to identify an output by identifying a row of the lookup table which reflects currently received inputs. For example, the computer 110 identifies the action to close the cover 120 when the cover 120 is open, the trailer 140 is mechanically connected to the vehicle 100, the socket 115 is electrically engaged, and the speed of the vehicle 100 exceeds the predetermined speed threshold. Alternatively, the computer 110 may determine that no action is identified, e.g., when the cover 120 is open, no trailer 140 is mechanically coupled, the socket 115 is electrically disengaged, and the vehicle 100 speed is below the predetermined speed threshold (as shown in Table 1). The character "X" in Table 1 indicates that an action of the respective row does not depend on a value of the input indicated by the column in which the "X" appears. Further, note that stored reference data such as a lookup table may include other relationships of inputs to actions.

TABLE 1

| | Inputs | | | |
|---|---|---|---|---|
| Cover Open/ Close | Trailer mechanically connected | Socket electrically engaged | Speed above threshold | Output Actions |
| Closed | TRUE | FALSE | X | Actuate a device, e.g., output a message to user interface |
| Closed | FALSE | FALSE | X | No Action |
| Opened | FALSE | FALSE | TRUE | Actuate the motor to close the cover |
| Opened | FALSE | FALSE | FALSE | No Action |
| Opened | FALSE | TRUE | X | Actuate a device, e.g., output a message to user interface |
| Opened | TRUE | FALSE | X | Actuate a device, e.g., output a message to user interface |
| Opened | TRUE | TRUE | X | No Action |

Next, in a decision block 1130, if the computer 110 has identified an action, the process 1100 proceeds to the block 1135; otherwise the process 1100 ends, or returns to the block 1105, although not shown in FIG. 11.

In the block 1135, the computer 110 causes the identified action. For example, the computer 110 may actuate the electric motor 410 to close the cover 120.

Following the block 1135, the process 1100 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor such that the computer is programmed to:

actuate an electric socket mounted to a vehicle exterior to close upon determining that the vehicle's speed exceeds a threshold, that a cover is open, and based on a message received via the electric socket from a second computer outside the vehicle following a request sent by the computer to the second computer, that the electric socket is in an electrically disengaged state.

2. The computer of claim 1, further programmed to actuate the electric socket to close upon determining that a vehicle hitch is in a decoupled state.

3. The computer of claim 1, further programmed to actuate the electric socket to close by actuating a cover that is mechanically coupled to an electric actuator.

4. The computer of claim 1, further programmed to determine whether the cover is open based on data received from at least one of a proximity sensor and a camera mounted to one of the electric socket and the exterior of the vehicle.

5. The computer of claim 1, further programmed to determine whether the electric socket is in an electrically disengaged state by determining, based on image data received from a camera sensor, whether an electric plug is connected to the electric socket.

6. The computer of claim 1, further programmed to determine whether the electric socket is in an electrically disengaged state by determining whether an electrical resistance between two electric contacts of the electric socket is less than a resistance threshold.

7. The computer of claim 1, further programmed to actuate an output device upon determining that a vehicle hitch is in a mechanically coupled state and that the electric socket is in an electrically disengaged state.

8. The computer of claim 7, further programmed to determine that the vehicle hitch is in the mechanically coupled state based on image data received from a camera sensor.

9. The computer of claim 8, wherein actuating the output device further includes actuating a vehicle transmission to inhibit a drive mode of the vehicle.

10. The computer of claim 1, further programmed to actuate an output device upon determining that a vehicle hitch is in a mechanically decoupled state and that the electric socket is in an electrically engaged state.

11. A system, comprising:
an electric socket, including:
a body mountable to a vehicle exterior;
a plurality of electric contacts within the body;
a cover pivotably coupled to the body;
an electric actuator mechanically engaged with the cover; and
a computer, comprising a processor and a memory, the memory storing instructions executable by the processor such that the computer is programmed to:
actuate the electric socket mounted to the vehicle exterior of to close upon determining that the vehicle's speed exceeds a predetermined threshold, that the cover is open, and that the electric socket is in an electrically disengaged state; and
determine whether the cover is open based on data indicating a direction of movement of the electric actuator and data indicating whether a motor load exceeds a load threshold.

12. The system of claim 11, further programmed to actuate the electric socket to close by actuating the electric actuator to move the cover to a closed state, wherein the cover in the closed state covers the electric contacts of the electric socket.

13. The system of claim 11, wherein the cover is mechanically coupled to the body via a pin having a longitudinal axis, and wherein the cover further includes a gear attached to the cover pivoting about the longitudinal axis of the pin.

14. The system of claim 13, wherein the electric actuator includes an electric motor having a shaft and a motor gear mounted to the shaft, wherein the motor gear is mechanically coupled to the gear of the cover.

15. The system of claim 14, wherein the gear of the cover is partially toothed having a first end tooth and a second end tooth, wherein the motor gear touches the first end tooth of a cover gear when the cover is open and the motor gear touches the second end tooth of the cover gear when the cover is closed.

16. A method, comprising:
actuating a cover of an electric socket mounted to an exterior of a vehicle to close when determined that the vehicle's speed exceeds a speed threshold and based on a message received via the electric socket from a second computer outside the vehicle following a request sent by the computer to the second computer, that the electric socket is in an electrically disengaged state.

17. The method of claim 16, further comprising causing an action when determined that the electric socket is in the electrically disengaged state and that a vehicle hitch is in a mechanically coupled state.

18. The method of claim 16, further comprising causing an action when determined that the electric socket is in an electrically engaged state and that a vehicle hitch is in a mechanically decoupled state.

19. A computer comprising a processor and a memory, the memory storing instructions executable by the processor such that the computer is programmed to:
actuate an electric socket mounted to a vehicle exterior of to close upon determining that the vehicle's speed exceeds a predetermined threshold, that a cover is open, that the electric socket is in an electrically disengaged state; and that a vehicle hitch is in a decoupled state.

* * * * *